United States Patent
Shimada

(10) Patent No.: US 11,964,513 B2
(45) Date of Patent: Apr. 23, 2024

(54) TIRE

(71) Applicant: BRIDGESTONE CORPORATION, Tokyo (JP)

(72) Inventor: Takashi Shimada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 261 days.

(21) Appl. No.: 17/607,271

(22) PCT Filed: Nov. 26, 2019

(86) PCT No.: PCT/JP2019/046136
§ 371 (c)(1),
(2) Date: Oct. 28, 2021

(87) PCT Pub. No.: WO2020/250459
PCT Pub. Date: Dec. 17, 2020

(65) Prior Publication Data
US 2022/0227181 A1    Jul. 21, 2022

(30) Foreign Application Priority Data
Jun. 14, 2019  (JP) .................................. 2019-111039

(51) Int. Cl.
*B60C 11/01*    (2006.01)

(52) U.S. Cl.
CPC ........ *B60C 11/01* (2013.01); *B60C 2200/065* (2013.01)

(58) Field of Classification Search
CPC .......................... B60C 11/01; B60C 2011/013
See application file for complete search history.

(56) References Cited

U.S. PATENT DOCUMENTS

2013/0220498 A1    8/2013   Kawakami
2016/0152097 A1    6/2016   Ferigo et al.
(Continued)

FOREIGN PATENT DOCUMENTS

CN       103079840 A    5/2013
DE    112016000553 T5   10/2017
(Continued)

OTHER PUBLICATIONS

Jun. 7, 2023 Search Report issued in European Patent Application No. 19933130.7.
(Continued)

*Primary Examiner* — Kendra Ly
(74) *Attorney, Agent, or Firm* — Oliff PLC

(57) ABSTRACT

A tire includes: circumferential grooves along a circumferential direction of a tire; lateral grooves along the circumferential direction, each lateral groove having one end opened to a side of the tire and the other end communicated with the circumferential groove; and narrow grooves in blocks defined by the circumferential and lateral grooves, each narrow groove having one end opened to the side of the tire and the other end communicated with the circumferential groove. The tire includes a surface that projects, at a position more to one side or the other in the circumferential direction than the narrow groove that is opened to the tire side, further to an outer side in a tire width direction than a tire side shape to which the narrow groove is opened, and the surface extends in a radial direction from a ground contact end to include a groove bottom of the narrow groove.

4 Claims, 5 Drawing Sheets

(56) References Cited

U.S. PATENT DOCUMENTS

2016/0207361 A1   7/2016 Ferigo et al.
2018/0022162 A1*  1/2018 Takemori ............ B60C 11/0311
                                                        152/209.18

FOREIGN PATENT DOCUMENTS

| DE | 112017002741 T5 | 3/2019 |
|----|-----------------|--------|
| EP | 3321103 A1 | 5/2018 |
| JP | H11-291718 A | 10/1999 |
| JP | H11-321234 A | 11/1999 |
| JP | 2008-013037 A | 1/2008 |
| JP | 2008-114738 A | 5/2008 |
| JP | 2013-018441 A | 1/2013 |
| JP | 2013-018442 A | 1/2013 |
| JP | 2013-018443 A | 1/2013 |
| JP | 2013-018447 A | 1/2013 |
| JP | 2014-012459 A | 1/2014 |
| JP | 2014-012470 A | 1/2014 |
| JP | 2016-088338 A | 5/2016 |
| JP | 2018-052318 A | 4/2018 |
| WO | 2008/056504 A1 | 5/2008 |
| WO | 2012/026595 A1 | 3/2012 |

OTHER PUBLICATIONS

Feb. 25, 2020 Search Report issued in International Patent Application No. PCT/JP2019/046136.
Nov. 25, 2022, Search Report Issued in Chinese Patent Application No. 201980097421.1.
Feb. 25, 2020 Written Opinion issued in International Patent Application No. PCT/JP2019/046136.

* cited by examiner

A-A SECTIONAL VIEW

TIRE ROTATION DIRECTION →

← TIRE ROTATION DIRECTION

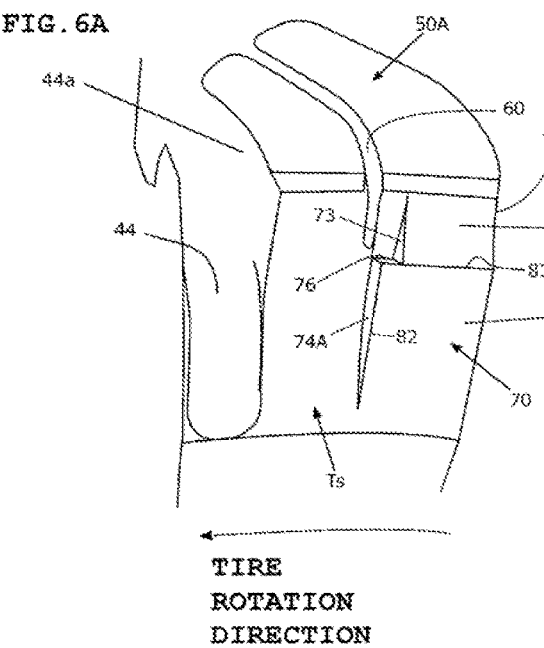
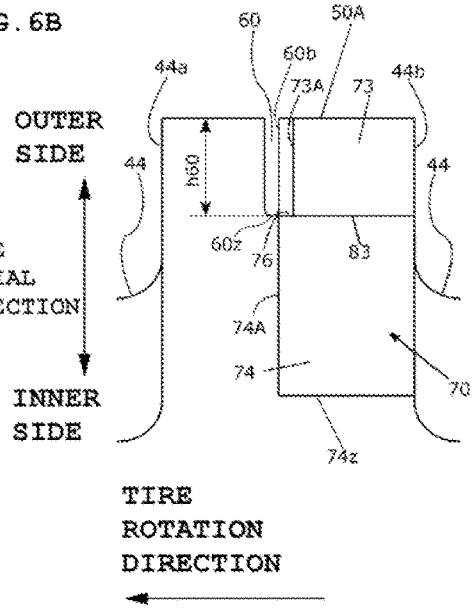
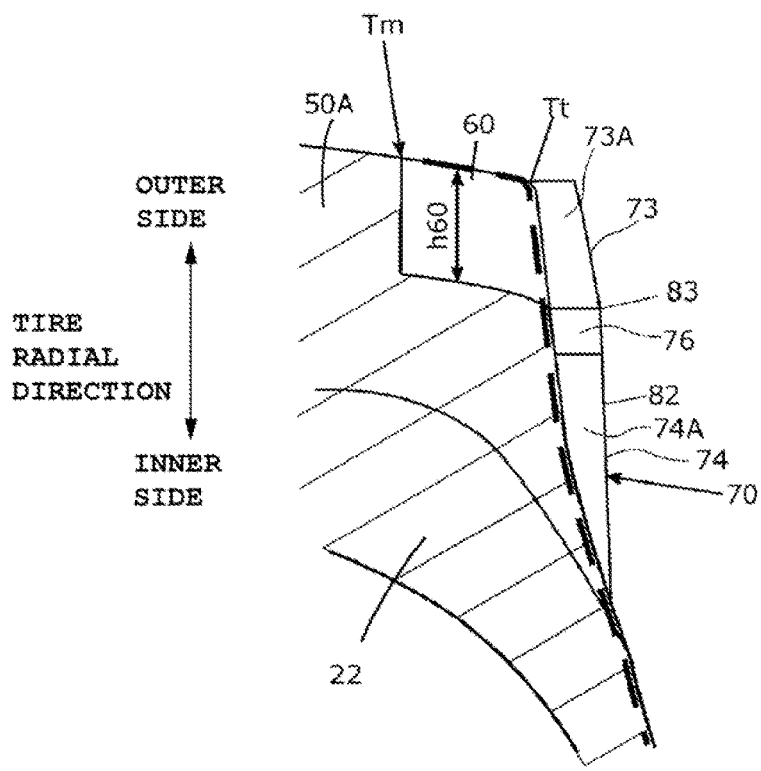

TIRE

TECHNICAL FIELD

The present invention relates to tires, and more particularly to a tire suitable for improving a durability of a heavy-load tire used in heavy-load vehicles such as large dump trucks, construction vehicles and the like.

BACKGROUND

Conventionally, a heavy-load tire as shown in Patent Document 1 has been known. In such a tire, a tread gauge is made thick so as to improve a wear life.

CITATION DOCUMENT

Patent Document

Patent Document 1: Japanese Unexamined Patent Application Publication No. 2008-114738.

SUMMARY OF THE INVENTION

Technical Problem

However, if the tread gauge is made thick, a heating temperature in a tread portion is increased, which results in degrading the durability of structural members such as a belt, hence it is likely to impair functions as a tire.

The present invention has been made in view of the above-mentioned problem, and aims at providing a tire capable of suppressing the increase in the heating temperature in the tread portion.

Solution to Problem

As a configuration of the tire for solving the above-mentioned problem, a tire according to an aspect of the invention includes: circumferential grooves each formed along a circumferential direction of a tire; lateral grooves provided at predetermined intervals along the circumferential direction of the tire, each of the lateral grooves having one end being opened to a side of the tire and the other end being communicated with the circumferential groove; and narrow grooves provided in blocks defined by the circumferential grooves and the lateral grooves, each of the narrow grooves having one end being opened to the side of the tire and the other end being communicated with the circumferential groove, in which the tire includes a projecting surface that projects, at a position more to one side or the other side in the circumferential direction of the tire than the narrow groove that is opened to the tire side, further to an outer side in a tire width direction than a tire side shape to which the narrow groove is opened, and in which the projecting surface extends in a tire radial direction from a ground contact end so as to include a groove bottom of the narrow groove.

BRIEF DESCRIPTION OF THE DRAWINGS

FIGS. 6A and 6B are diagrams illustrating another form of the projecting part; and FIG. 7 is a diagram illustrating another form of the projecting part.

DESCRIPTION OF EMBODIMENTS

Figure 1:
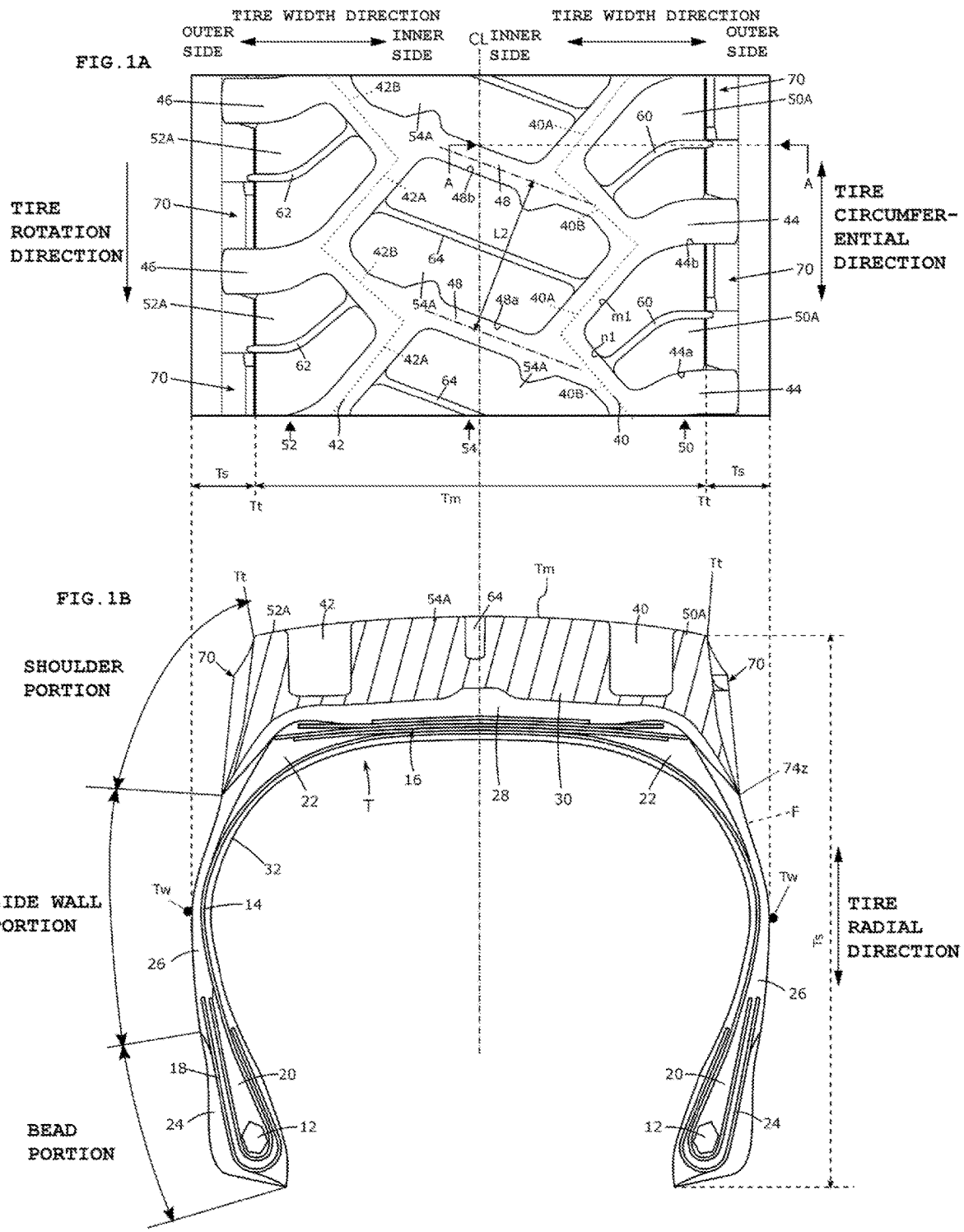
FIGS. 1A and 1B are a plan view of a tread portion and a cross-sectional view of a tire, respectively.

The present invention will be described in detail below through embodiments of the invention; however, the following embodiments are not intended to limit the inventions set forth in the claims, and all of combinations of the features described in the embodiments are not necessarily essential to the solving means of the invention, but selectively employed configurations are included.

FIGS. 1A and 1B are a plan view of a tread portion and a cross-sectional view of a tire, respectively. A tire T illustrated in FIGS. 1A and 1B has a structure applied to a heavy-load tire.

As illustrated in FIG. 1B, the tire T includes a bead core 12, a carcass 14, a belt 16 and a chafer 18, which are formed of mainly cord members, and a bead filler 20, a belt under rubber 22, a rim cushion rubber 24, a side rubber 26, a base rubber 28, a tread rubber 30 and an inner liner 32, which are formed of mainly rubber members.

Incidentally, in the following description, directions are explained, as illustrated in FIG. 1, as a tire width direction, a tire circumference direction and a tire radial direction. With respect to the tire width direction, the direction is defined such that, in the direction of a paper surface, right and left are defined with a tire center CL as a center line separating to right and left, a tire center Cl side is defined as an inner side, and each end part Tt side of right and left-ground contact surfaces Tm is defined as an outer side, and so on. For the convenience of explanation, a direction of rotation of the tire T is specified as shown by the arrows in the figure.

The bead core 12 is formed in a ring shape and is provided in pair on the right and left-sides of the tire T. The carcass 14 is configured of one or more carcass plies stacked on top of each other, and is folded back so as to be rolled up from the inner side to the outer side of each bead core 12, to thereby extend in a toroidal shape between the bead cores 12. The belt 16 is configured of one or more belt plies stacked on top of each other and is provided by winding a crown part of the toroidally formed carcass 14 in the circumferential direction. The chafer 18 is formed in a sheet shape and is provided so as to enclose the outer side of the carcass 14 wound to the bead core 12.

The bead filler 20 is provided between the carcass 14 folded over the bead core 12. The belt under-rubber 22 is provided between the carcass 14 at each end part in the tire width direction of the belt 16. The rim cushion rubber 24 is provided on the outer side in the tire width direction of the chafer 18. The side rubber 26 is provided on the outer side in the tire radial direction of the rim cushion rubber 24 so as to cover the outer side in the tire width direction of the belt under rubber 22. The base rubber 28 is provided on the outer side in the tire radial direction of the belt 16 and extends between the right and left-side rubbers 26. The tread rubber 30 is provided over the base rubber 28 on the outer side in the tire radial direction and extends so as to cover the right and left-side rubbers 26 to thereby form the tread portion of the tire T. The inner liner 32 is provided so as to cover the entire inner circumference of the toroidally formed carcass 14, and provides airtightness as a pneumatic tire.

As illustrated in FIG. 1A, a tread pattern configured of a block pattern is formed on the tread rubber 30. The block pattern according to the present embodiment is formed by defining two shoulder land portions 50; 52 that are continuous in the tire circumferential direction and a center land portion 54 by a plurality (two in the present embodiment) of circumferential grooves 40; 42 extending in a zigzag manner in the tire circumferential direction, and by arranging plural numbers of lateral grooves 44; 46; 48 that extend in the tire width direction, in each of the land portions 50; 52; 54 at predetermined intervals in the tire circumferential direction.

The lateral grooves 44 are formed in the shoulder land portion 50 in such a matter that one end thereof is opened to one of tire sides Ts and the other end thereof is communicated with the circumferential groove 40, and are provided at predetermined intervals in the tire circumferential direction. In other words, the shoulder land portion 50 is configured by arranging shoulder blocks 50A, which are defined by adjacent lateral grooves 44; 44 and the circumferential groove 40, continuously in the tire circumferential direction.

The lateral grooves 46 are formed in the other shoulder land portion 52 in such a matter that one end thereof is opened to the other one of the tire sides Ts and the other end thereof is communicated with the circumferential groove 42, and are provided at predetermined intervals in the tire circumferential direction. In other words, the shoulder land portion 52 is configured by arranging shoulder blocks 52A, which are defined by adjacent lateral grooves 46; 46 and the circumferential groove 42, continuously in the tire circumferential direction.

The lateral grooves 48 are formed in the center land portion 54 to be inclined at a predetermined angle with respect to the tire width direction, so as to be communicated with the circumferential groove 40 and the circumferential groove 42, and are provided at predetermined intervals in the tire circumferential direction. In other words, the center land portion 54 is configured by arranging center blocks 54A, which are defined by adjacent lateral grooves 48; 48 and the circumferential grooves 40; 42, continuously in the tire circumferential direction.

Incidentally, the block pattern according to the present embodiment is formed so that the direction of rotation is not designated when the tire is mounted on a vehicle. That is, the block pattern was formed such that, when the ground contact surface Tm is plane viewed, the block pattern becomes symmetry (point-symmetry) around a point set at an arbitrary position on the tire center CL. In other words, the block pattern was formed by rotating 180° the left side from the tire center CL and aligning the positions of the lateral grooves 48 that define the center block 54A. And, for example, the tire is mounted on the vehicle so that the circumferential groove 40 side is on the outer side of the vehicle body and the circumferential groove 42 is on the vehicle side.

The circumferential groove 40 is configured of an inclined groove 40A and an inclined groove 40B that extend in a zigzag pattern while alternately inclined in opposite directions with respect to the tire circumferential direction, and the circumferential groove 42 is formed of an inclined groove 42A and an inclined groove 42B that extend in a zigzag pattern while alternately inclined in opposite directions with respect to the tire circumferential direction. In the present embodiment, since the tread pattern is point-symmetry, the inclined groove 40A of the circumferential groove 40 corresponds to the inclined groove 42A of the circumferential groove 42, and the inclined groove 40B of the circumferential groove 40 corresponds to the inclined groove 42B of the circumferential groove 42.

In the circumferential groove 40, the inclined groove 40A is formed to be inclined along the tire rotation direction from the outer side toward the inner side in the tire width direction, and the inclined groove 40B is formed to be inclined along the tire rotation direction from the inner side toward the outer side in the tire width direction. In the circumferential groove 42, the inclined groove 42A is formed to be inclined along the tire rotation direction from the inner side toward the outer side in the tire width direction, and the inclined groove 42B is formed to be inclined along the tire rotation direction from the outer side toward the inner side in the tire width direction.

The lateral grooves 44 are formed so as to extend from a tire side in a bowed manner in the tire width direction and to be smoothly continuous with the inclined grooves 40B, and the lateral grooves 46 are formed so as to extend from a tire side in a bowed manner in the tire width direction and to be smoothly continuous with the inclined grooves 42B.

The lateral grooves 48 are formed so as to incline in the same direction as the inclined grooves 40B and the inclined grooves 42B. An angle at which the lateral groove 48 is inclined is set to be smaller than an angle at which the inclined groove 40B and the inclined groove 42B intersect with respect to the tire width direction, and are communicated with the inclined groove 40B and the inclined groove 42B.

With respect to the lateral grooves 44; 46, groove widths w44; w46 (see FIG. 3B) are set to be wider than, for example, a groove width of the inclined groove 40B and a groove width of the inclined groove 42B to which the lateral grooves 44; 46 are connected.

The above-mentioned circumferential grooves 40; 42 and the lateral grooves 48 are grooves that serve as references for determining a usage limit due to wear, and are provided with wear indicators that indicate the usage limit of the tire T. The lateral grooves 44; 46 are formed in such a manner that depths thereof on the circumferential grooves 40; 42 sides are formed at the same depth as that of the circumferential grooves 40; 42, and gradually become deeper in an arc shape as the lateral grooves 44; 46 go in the tire width direction. In other words, the lateral grooves 44; 46 are formed to open wide in the tire radial direction at the tire side so that a groove depth h44z of the opening at the tire side becomes deeper than a groove depth h44 on the circumferential groove 40; 42 side (see FIG. 3B).

Figure 2:
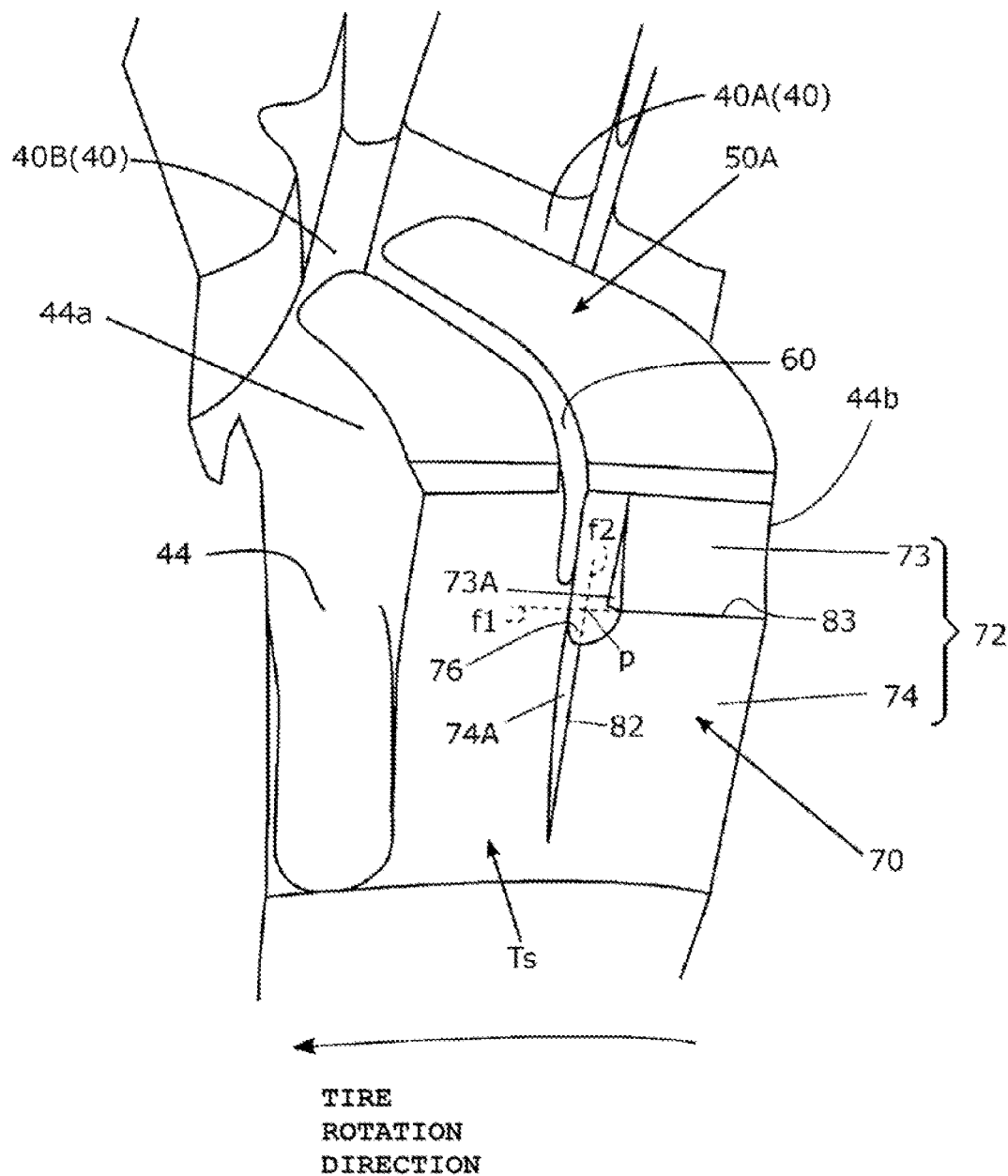
FIG. 2 is an external perspective view of a shoulder block.
Figure 3A:
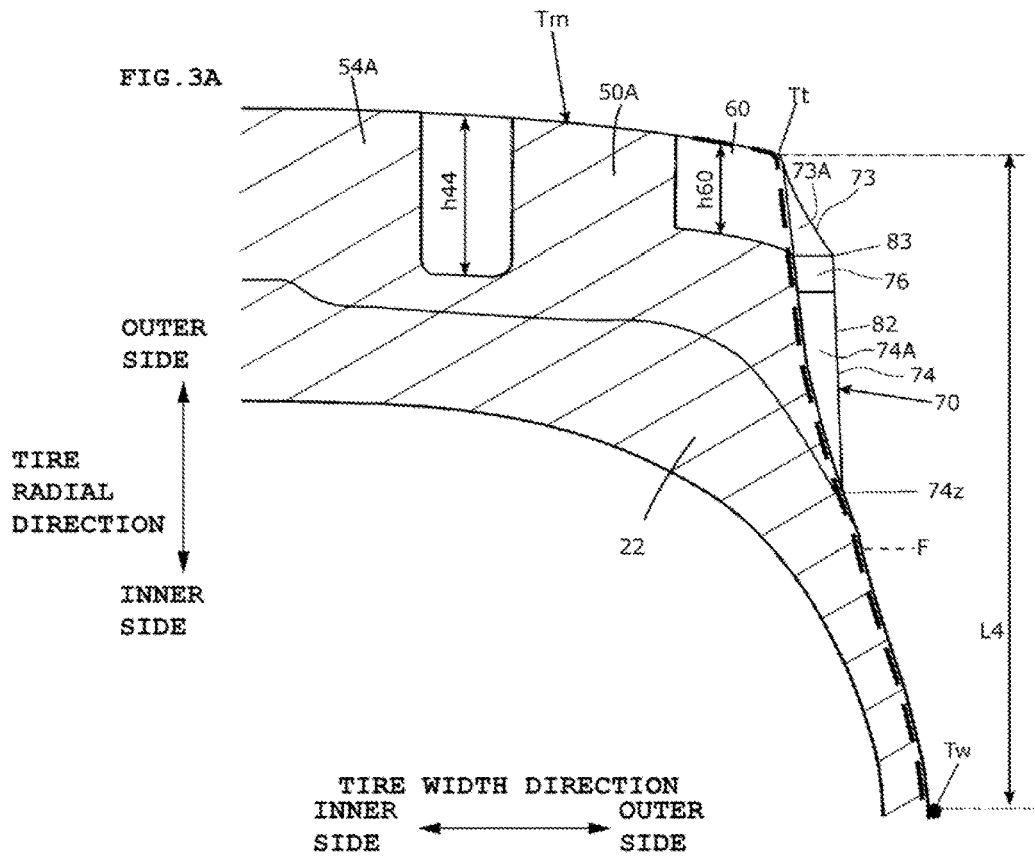
FIGS. 3A and 3B are a cross-sectional view of a part cut by A-A line shown in FIG. 1A and a plan view of a side of the tire, respectively.
Figure 3B:
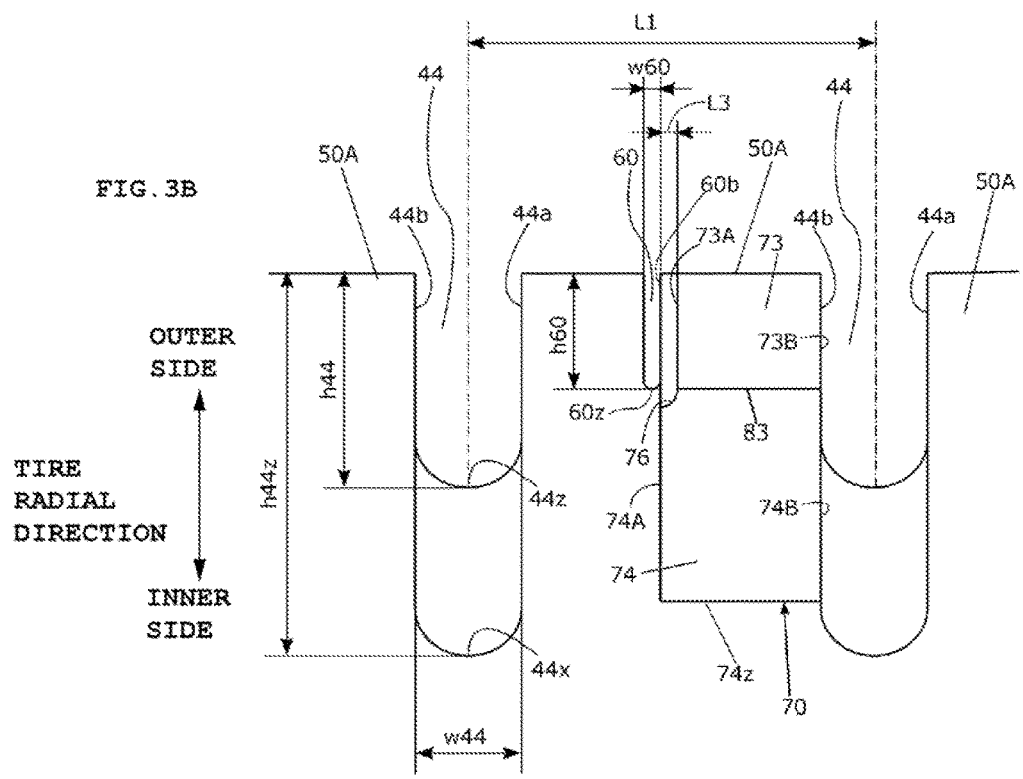

FIG. 2 is an external perspective view of the shoulder block. FIGS. 3A and 3B are a cross-sectional view of a part cut by A-A line shown in FIG. 1A and a plan view of a side of the tire, respectively. Hereinafter, the configuration of the shoulder block will be described using FIG. 1 to FIGS. 3A and 3B. However, as described above, since the tread pattern according to the present embodiment is point-symmetry, an explanation will be given using the shoulder block 50A, which is defined by the circumferential groove 40 and lateral grooves 44; 44 adjacent to each other in the tire circumferential direction.

As illustrated in FIG. 1A and FIG. 2, the shoulder block 50A has a narrow groove 60 extending along an extended direction of the shoulder block 50A. The narrow groove 60 is formed in such a manner that one end opens to the tire side surface Ts and the other end opens to the inclined groove 40B of the circumferential groove 40. Specifically, the narrow groove 60 is formed so as to extend midway between the groove wall 44a of the lateral groove 44 that is continuous with the groove wall m1 of the inclined groove 40A and the groove wall 44b of the other lateral groove 44 that defined the shoulder block 50A.

The narrow groove 60 is formed with the same depth from one end side to the other end side in the extension direction, for example, from the ground contact surface Tm. As illustrated in FIG. 3B, a groove depth h60 of the narrow groove 60 may be set within a range of, for example, 50% to 100% preferably 60% to 95%, more preferably 65% to 90%, and even more preferably 70% to 85% of the groove depth h40 of the circumferential groove 40.

Further, a groove width w60 of the narrow groove 60 may be, for example, 2% to 8%, preferably 3% to 7%, and more preferably 4% to 6% of a distance L1 in the tire circumferential direction of the lateral grooves 44; 44 that define the shoulder block 50A.

Incidentally, also in the shoulder block 52A, a narrow groove 62 is formed as similarly to the shoulder block 50A.

As illustrated in FIG. 1A, the center block 54A includes a narrow groove 64 that extends along the extension direction of the lateral grooves 48 that define the center block 54A. The narrow groove 64 is formed in such a manner that one end opens to the inclined groove 40A of the circumferential groove 40 and the other end opens to the inclined groove 42A of the circumferential groove 42. The narrow groove 64 is formed so as to extend midway between the groove wall 48a of one lateral groove 48 and the groove wall 48b of the other lateral groove 48 that define the shoulder block 54A.

The narrow groove 64 is formed, for example, with the same depth from the ground surface Tm, from one end side to the other end side in the extension direction. A groove depth h64 of the narrow groove 64 may be set within a range of, for example, 50% to 100%, preferably 60% to 95%, more preferably 65% to 90%, and even more preferably 70% to 85% of the groove depth h40 of the circumferential groove 40.

Further, a groove width w64 of the narrow groove 64 may be, for example, 2% to 8%, preferably 3% to 7%, and more preferably 4% to 6% of a distance L2 between center lines of the lateral grooves 44; 44 defining the shoulder block 50A.

As described above, by forming the narrow grooves 60; 62 in the shoulder blocks 50A; 52A and the narrow groove 64 in the center block 54A, the shoulder blocks 50A; 52A and the center block 54A are formed so as to have two small blocks in appearance, to an extent that each of the narrow grooves 60; 62 does not disappear due to wear.

By providing the narrow grooves 60; 62; 64 in the shoulder blocks 50A; 52A and the center block 54A, surface areas of the shoulder blocks 50A; 52A and the center block 54A can be increased, and a heat dissipation area can be widened even when a thickness of the tread rubber 30 is made thick.

As illustrated in FIG. 1 to FIGS. 3A, 3B, a projecting part 70 that extends in the tire width direction is provided on the tire side surface Ts side of the shoulder block 52A. The projecting part 70 is provided, for example, in correspondence with the narrow groove 60.

The projecting part 70 has a projecting wall 72 that projects in the tire width direction with an even thickness along the tire circumferential direction. The projecting wall 72 has a first projecting wall 73 formed on the outer side in the tire radial direction and a second projecting wall 74 formed continuously with the first projecting wall 73 on the inner side in tire radial direction, continuous with the first projecting wall 73.

As illustrated in FIG. 3A, the first projecting wall 73 is formed in such a manner that, in a cross-sectional view, an amount of projection gradually increases in the tire width direction than a basic shape F of the tire side surface Ts, as the first projecting wall 73 goes from the edge Tt side of the ground contact surface Tm to the inner side in the tire radial direction. The basic shape F refers to a cross-sectional outline shape of the tire side surface Ts at a position where the projecting part 70 is not formed.

As illustrated in FIGS. 3A and 3B, the first projecting wall 73 is formed, with respect to the tire radial direction, for example, within a range extended in the tire width direction from the end part Tt of the ground contact surface Tm to a groove bottom 60z of the narrow groove 60.

Also, as illustrated in FIG. 3B, the first projecting wall 73 is formed, with respect to the tire circumferential direction, within a range extended from a rear position distant by a distance L3 from the groove wall 60b on the rear side in the tire rotational direction of the narrow groove 60 that is opened to the tire side surface Ts, to the groove wall 44b on the front side in the tire rotational direction of the lateral groove 44 that forms the shoulder block 50A.

An end surface (hereinafter referred to as the projecting surface) 73A on the front side in the tire rotation direction of the first projecting wall 73 is formed, for example, in a planar shape extending along the tire radial direction and the tire width direction. The projecting surface 73A is not limited such that an edge part 81 forming the projecting surface 73A extends in the tire radial direction, but may be formed so as to be inclined with respect to the tire radial direction, or may be formed so as to extend in parallel with an edge part 82 forming an end surface 74B described later. Further, an end surface 73B in the tire rotation direction of the first projecting wall 73 is formed in a planar shape in which the groove wall 44b is continuously extended in the tire width direction.

The second projecting wall 74 is formed in such a manner that, in a cross-sectional view, an amount of projection gradually decreases in the tire radial direction than the basic shape F of the tire side surface Ts, as the second projecting wall 74 goes from the inner side in the tire radial direction of the first projecting wall 73 further to the inner side in the tire radial direction.

As illustrated in FIGS. 3A and 3B, the second projecting wall 74 is formed, with respect to the tire radial direction, within a range in which the second projecting wall 74 continues from the inner side in the tire radial direction of the first projecting wall 73 to the basic shape F at the outer side in the tire radial direction outer by a predetermined distance than the position of an opening groove bottom 44x where the lateral groove 44 is opened to the tire side surface Ts. That is, the second projecting wall 74 is formed in such a manner that a boundary 74z between the second projecting wall 74 and the basic shape F is located more outward in the tire radial direction than the location of the opening groove bottom 44x.

Also, as illustrated in FIG. 3B, the second projecting wall 74 is formed, with respect to the tire circumferential direction, within a range extending from a position where the groove wall 60b on the rear side in the tire rotational direction of the narrow groove 60, which is opened to the tire side surface Ts, is extended in the tire radial direction to the groove wall 44b on the front side in the tire rotation direction of the lateral groove 44, which forms the shoulder block 50A.

An end surface (hereinafter referred to as the projecting surface) 74A on the front side in the tire rotation direction of the second projecting wall 74 is formed, for example, in a planar shape extending along the tire radial direction and the tire width direction. Further, the end surface 74B in the tire rotation direction of the second projecting wall 74 is formed in a planar shape so as to be flush with the end surface 73B of the first projecting wall 73.

As described above, since the projecting surface 73A and the projecting surface 74A are formed as being displaced in the tire rotational direction, these surfaces are connected via a connecting surface 76. The connecting surface 76 is formed in a spherical shape, for example.

As illustrated in FIG. 2, the connecting surface 76 is formed, for example, by a spherical surface with an intersection point p, as a center, at which an extension line f1 that is an extension of a boundary edge 83 along the tire circumferential direction and an extension line f2 of the edge part 82 forming the end surface 74B intersect.

By making the connecting surface 76 spherical, cracks that occur, when the projecting surface 73A and the projecting surface 74A come into contact with uneven road surfaces, stones and the like, between the projecting surface 73A and the projecting surface 74A can be prevented.

As such, with the provision of the projecting part 70, the air flowed along the tire side surface Ts collides with the projecting surface 73A, the projecting surface 74A and the connecting surface 76, and flows in the tire radial direction and the tire width direction. Of the air, air flowed toward the inner side in the tire width direction flows into the narrow grooves 60 provided in the shoulder blocks 50A, creates a forced flow in the narrow grooves 60, thus can actively cool each of the shoulder blocks 50A.

Figure 4:
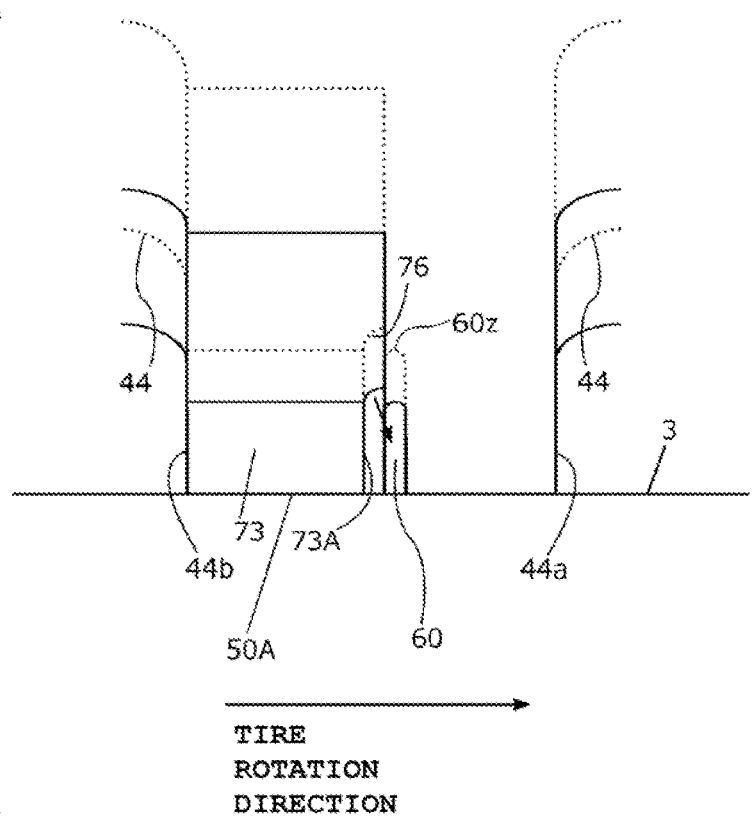
FIG. 4 is a diagram illustrating an action of a projecting part at the time when the tire is in contact with the ground.

FIG. 4 is a diagram illustrating an action of the projecting part 70 at the time when the tire is in contact with the ground. Furthermore, when the ground surface Tm is brought into contact with the road surface 3, the projecting part 70 is pushed and deformed by the weight of the vehicle toward the road surface 3 from a state indicated by the dotted line in the figure. At this time, since the connecting surface 76 moves in the direction of the road surface 3, the connecting surface 76 acts to push the air in the area surrounded by the connecting surface 76, the projecting surface 73A, and the road surface 3 toward the road surface 3, and causes the pushed air to flow into the narrow groove 60. This makes it possible to increase an amount of air than the amount of air more than an amount of air flowing into the grooves 60 other than being in contact with the ground. In this way, each shoulder block 50A can be cooled by allowing air to flow into the narrow grooves 60 at the time the tire contacts with the ground, which is a main cause of heat generation in the tire T. As a result, the heat generation in the tread portion is suppressed, hence the durability of the tire T can be improved.

Next, an explanation will be given as to the function of the projecting part 70 provided in the shoulder block 52A. In the present embodiment, since the tread pattern was made to be point-symmetry, the projecting part 70 provided in the shoulder block 52A is located on the front side in the tire rotation direction of the narrow groove 62. In other words, the projecting surface 73A and the projecting surface 74A at the narrow groove 62 are located on the rear side in the tire rotation direction.

In this case, by the air flowed through the tire side surface Ts and past the projecting part 70, pressures on the projecting surface 73A side and on the projecting surface 74A side become negative, and act to suck out the air in the narrow groove 62.

Therefore, similar to the case where the explanation was given using the shoulder block 52A described above, because a forced flow can be generated in the narrow groove 62, the shoulder block 52A can be cooled from the inside.

As described above, according to the present embodiment, by having provided the narrow grooves 60; 62, which are opened to the tire side surface Ts, in the shoulder blocks 50A; 52A of the tire T in which the block pattern was formed, and having provided the projecting parts 70, which extend in the tire width direction, in correspondence with the narrow grooves 60; 62, the forced air flow can be created in the narrow grooves 60; 62. Whereby, the shoulder block 50A is cooled from the outside by the air flowing through the lateral grooves 44; 44 and the circumferential grooves 40 that define the shoulder block 50A, and is also cooled from the inside by the air forcibly flowing through the narrow grooves 60. In addition, the shoulder block 52A is cooled from the outside by the air flowing through the lateral grooves 46; 46 and the circumferential grooves 42 that define the shoulder block 52A, and is also cooled from the inside by the air forcibly flowing through the narrow grooves 60. Therefore, even if the thickness of the tread rubber 30 is made thick, increase in the temperature of the tread portion can be suppressed, hence the durability of the tire T can be improved.

Figure 5:
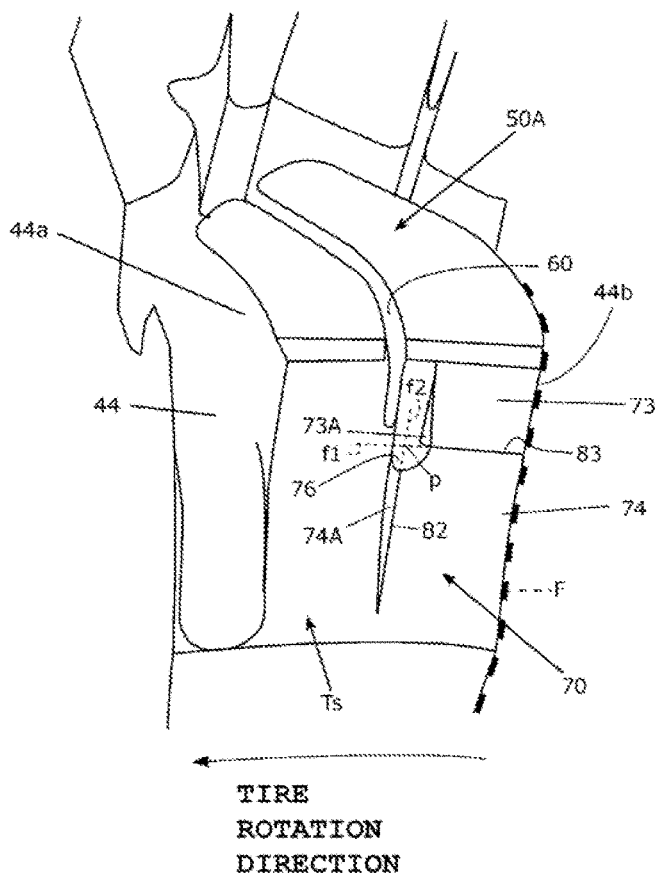
FIG. 5 is a diagram illustrating another form of the projecting part.

FIG. 5 is a diagram illustrating another form of the projecting part 70.

In the above-described embodiment, the projecting part 70 has been described as being formed with a uniform thickness in the tire circumferential direction, but is not limited thereto. For example, as illustrated in FIG. 5, the projecting part 70 may be formed such that the thickness becomes thinner as the projecting part 70 goes toward the rear side in the tire rotation direction. That is, the projecting part 70 may be formed so that the end surfaces on the rear end sides of the first projecting wall 73 and the second projecting wall 74 are eliminated.

Further, in the above-described embodiment, the projecting part 70 has been described as being formed, with respect to the tire radial direction, within a range in which the projecting part 70 continues from the end part Tt of the ground contact surface Tm to the basic shape F at a position in the tire radial direction upper than the position of the opening groove bottom 44x where the lateral groove 44 is opened to the tire side surface Ts, but is not limited thereto. The projecting part 70 may be formed so as to include at least from the end part Tt of the ground contact surface Tm to the groove bottom 60z of the narrow groove 60.

FIGS. 6A and 6B are diagrams illustrating another form of the projecting part 70. In the above-described embodiment, the connecting surface 76 has been described as being formed in the spherical shape, but is not limited thereto. For example, as illustrated in FIGS. 6A and 6B, the connecting surface 76 may be a planer surface orthogonal to the projecting surface 73A and the projecting surface 74A, or may be an arcuate surface formed along the tire circumferential direction.

Further, the projecting part 70 may be formed, with respect to the tire radial direction, for example, so as to extend from the end part Tt of the ground contact surface Tm to the tire maximum width part Tw. The projecting part 70 may be formed from the end part Tt of the ground contact surface Tm within a range of preferably 50% to 80%, more preferably 55% to 75%, and even more preferably 60% to 70% of a distance L4 from the end part Tt of the ground contact surface Tm to the tire maximum width part Tw.

FIG. 7 illustrates another form of the projecting part 70. The projecting part 70 has been described, with respect to the tire width direction, as being gradually projected in the tire width direction as it goes from the end part Tt of the ground contact surface Tm toward the tire radial direction, but is not limited thereto. For example, as illustrated in FIG. 7, the projecting part 70 may be made to project in the tire width direction beforehand at the end part Tt of the ground contact surface Tm, and the projecting surface 73A may be made to have a rectangular shape instead of the triangular shape illustrated in FIG. 3A.

The tire T equipped with the projecting part 70 according to the present embodiment is particularly suitable as a heavy-load tire for trucks, buses, construction vehicles and the like, whose continuous operating time is long and, in addition, the load on the tire is large.

In summary, the present invention can be described as follows. Namely, a tire according to an aspect of the invention includes: circumferential grooves each formed along a circumferential direction of a tire; lateral grooves provided at predetermined intervals along the circumferential direction of the tire, each of the lateral grooves having one end being opened to a side of the tire and the other end being communicated with the circumferential groove; and narrow grooves provided in blocks defined by the circumferential grooves and the lateral grooves, each of the narrow grooves having one end being opened to the side of the tire and the other end being communicated with the circumferential groove, in which the tire includes a projecting surface that projects, at a position more to one side or the other side in the circumferential direction of the tire than the narrow groove that is opened to the tire side, further to an outer side in a tire width direction than a tire side shape to which the narrow groove is opened, and in which the projecting surface extends in a tire radial direction from a ground contact end so as to include a groove bottom of the narrow groove.

According to this configuration, since the air flowing through the sides of the tire creates a forced air flow in the narrow grooves, it is possible to suppress the rise of the heat generation temperature in the tread portion.

As another configuration of the tire, the projecting surface may include: a first projecting surface that extends in the tire radial direction within a range of the groove depth of the narrow groove, and a second projecting surface provided on an inner side in the tire radial direction than the first projecting surface; and the second projecting surface is provided to be displaced in the tire circumferential direction so as to be located on a narrow groove side than the first projecting surface.

REFERENCE SIGN LIST

3: Road surface, 12: Bead core, 14: Carcass, 16: Belt, 18: Chafer, 20: Bead filler, 22: Belt under rubber, 24: Rim cushion rubber, 26: Side rubber, 28: Base rubber, 30: Tread rubber, 32: Inner rubber, 40: Circumferential groove, 42: Circumferential Groove, 44: Lateral groove, 44x: Opening groove bottom, 46: Lateral groove, 48: Lateral groove, 50: Shoulder land, 50A: Shoulder block, 52: Shoulder land, 52A: Shoulder block, 54: Center land, 54A: Center block, 60: Narrow groove, 60b: Groove wall, 60z: Ggroove bottom, 62: Narrow groove, 64: Narrow groove, 70: Projecting part, 72: Projecting wall, 73: First projecting wall, 73A: End surface (projecting surface), 74: Second projecting wall, 74A: End surface (projecting surface), 76: Connecting surface, 83: Boundary edge, CL: Tire center, F: Basic shape, L1: Distance, L2: Distance, L3: Distance, L4: Distance, m1: Groove wall, n1: groove wall, T: Tire, Tm: Ground contact surface, Ts: tire side, Tt: end part, Tw: Tire maximum width.

The invention claimed is:

1. A tire comprising:
   circumferential grooves each along a circumferential direction of a tire;
   lateral grooves at predetermined intervals along the circumferential direction of the tire, each of the lateral grooves having one end opened to a side of the tire and the other end communicated with the circumferential groove; and
   narrow grooves in blocks defined by the circumferential grooves and the lateral grooves, each of the narrow grooves having one end opened to the side of the tire and the other end communicated with the circumferential groove, wherein
   the tire includes a projecting surface that projects at a position more to one side in the circumferential direction of the tire than the narrow groove that is opened to the tire side, and projects further toward an outer side in a tire width direction than a tire side shape to which the narrow groove is opened,
   the projecting surface includes a first projecting surface that extends in the tire radial direction within a range of the groove depth of the narrow groove, and a second projecting surface inward of the first projecting surface in the tire radial direction,
   the first projecting surface and the second projecting surface are connected via a spherical surface, and
   the projecting surface extends in a tire radial direction from a ground contact end to radially inward of a groove bottom of the narrow groove.

2. The tire according to claim 1, wherein the projecting surface is on a front side of a projection in a tire rotation direction.

3. The tire according to claim 1, wherein the first projecting surface and the second projecting surface are on a front side of a projection in a tire rotation direction.

4. The tire according to claim 3, wherein the first projecting surface and the second projecting surface are offset in the tire rotation direction.

* * * * *